(12) United States Patent
Tojo et al.

(10) Patent No.: US 8,401,699 B2
(45) Date of Patent: Mar. 19, 2013

(54) MANIPULATOR AND MANIPULATOR POSTURE CONTROL METHOD

(75) Inventors: Tsuyoshi Tojo, Osaka (JP); Osamu Mizuno, Osaka (JP); Akinobu Okuda, Osaka (JP); Yoshihiko Matsukawa, Nara (JP); Rie Takahashi, Osaka (JP); Soichiro Fujioka, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 729 days.

(21) Appl. No.: 12/480,973

(22) Filed: Jun. 9, 2009

(65) Prior Publication Data
US 2009/0312868 A1 Dec. 17, 2009

(30) Foreign Application Priority Data
Jun. 11, 2008 (JP) .................................. 2008-152593

(51) Int. Cl.
*G06F 19/00* (2011.01)
(52) U.S. Cl. ......... 700/245; 700/255; 700/259; 700/262
(58) Field of Classification Search .................. 700/245, 700/255, 259, 262, 900; 901/8, 14, 30
See application file for complete search history.

(56) References Cited

U.S. PATENT DOCUMENTS

| | | | | |
|---|---|---|---|---|
| 6,690,999 B2 * | 2/2004 | Kimura | | 700/245 |
| 7,086,293 B2 * | 8/2006 | Heiligensetzer et al. | | 73/795 |
| 2003/0018412 A1 * | 1/2003 | Kimura | | 700/245 |
| 2006/0177295 A1 * | 8/2006 | Frueh et al. | | 414/695.8 |
| 2009/0171505 A1 * | 7/2009 | Okazaki | | 700/258 |

FOREIGN PATENT DOCUMENTS

| JP | 9-207089 | | 8/1997 |
|---|---|---|---|
| JP | 09207089 A | * | 8/1997 |

* cited by examiner

*Primary Examiner* — Khoi Tran
*Assistant Examiner* — Jorge Peche
(74) *Attorney, Agent, or Firm* — Wenderoth, Lind & Ponack, L.L.P.

(57) ABSTRACT

A manipulator includes a main unit movable to a specified target position, an arm unit rotatably provided on the main unit, and a posture controller. The posture controller controls the posture of the arm unit so that a front surface of the arm unit facing forward in a moving direction of the main unit is not orthogonal to the moving direction of the main unit when the movement of the main unit is performed. The arm unit may be inclined obliquely backward with respect to a moving direction of the main unit when the main unit is moved to a specified target position.

16 Claims, 9 Drawing Sheets

MANIPULATOR AND MANIPULATOR POSTURE CONTROL METHOD

BACKGROUND OF THE INVENTION

1. Field of the Invention

The present invention relates to a manipulator and a manipulator posture control method.

2. Description of the Related Art

Various technologies for avoiding a collision with an obstacle have been proposed.

For example, in a conventional manipulator posture control device, a target posture is inputted and a manipulator is moved so that an initial posture and the target posture coincide while a distance between the manipulator and an obstacle is measured based on an image captured by a camera provided at the leading end of the manipulator. The posture of the manipulator is controlled to avoid the obstacle when the manipulator is judged to have come to a position at a specified distance from or closer to the obstacle from the captured image (see, for example, Japanese Unexamined Patent Publication No. H09-207089).

Since the conventional manipulator posture control device aims to avoid a collision with an obstacle, measures in the case where the manipulator collides without being able to avoid a collision are insufficient. Thus, if the manipulator collides head-on without being able to avoid an obstacle, there is a problem that a colliding force with the obstacle cannot be reduced.

SUMMARY OF THE INVENTION

Accordingly, an object of the present invention is to provide a manipulator and a manipulator posture control method enabling a colliding force with an obstacle to be reduced even in the case of a collision with the obstacle without being able to avoid it.

One aspect of the present invention is directed to a manipulator, comprising a main unit movable to a specified target position; an arm unit rotatably provided on the main unit; and a posture controller for controlling the posture of the arm unit so that a front surface of the arm unit facing forward in a moving direction of the arm unit is not orthogonal to the moving direction of the arm unit when the movement of the main unit or the rotation of the arm unit is performed.

Another aspect of the present invention is directed to a manipulator posture control method, characterized by controlling a posture of an arm unit such that a front surface of the arm unit facing forward in a moving direction is not orthogonal to a moving direction of the arm unit when at least one of the movement of a main unit movable to a specified target position and the rotation of the arm unit rotatably provided on the main unit is performed.

DETAILED DESCRIPTION OF THE PREFERRED EMBODIMENTS OF THE INVENTION

Hereinafter, one embodiment of the present invention is described with reference to the drawings. It should be noted that the following embodiment is a specific example of the present invention and not of the nature to limit the technical scope of the present invention.

First Embodiment

Figure 1:
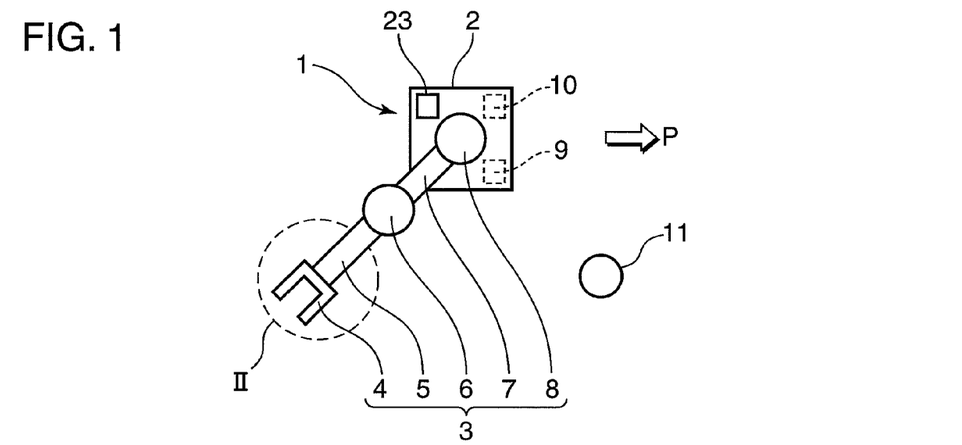
FIG. 1 is a schematic top view of a manipulator 1 according to a first embodiment of the invention.
Figure 2:
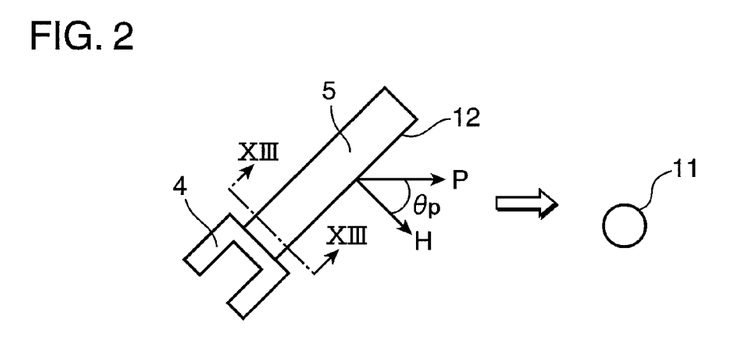
FIG. 2 is an enlarged view of a portion II of FIG. 1, FIG. 3 are conceptual diagrams showing a colliding force given to an obstacle by an arm of the manipulator 1.

First of all, a schematic construction of a manipulator 1 according to the embodiment of the present invention is described with reference to FIGS. 1 to 3. FIG. 1 is a schematic top view of the manipulator 1 according to the embodiment of the invention, FIG. 2 is an enlarged view of an essential portion II of FIG. 1, and FIG. 3 is a conceptual diagram showing a colliding force given to an obstacle by an arm of the manipulator 1.

As shown in FIG. 1, the manipulator 1 is provided with a main unit 2 movable to a desired target position and an arm unit 3 rotatably supported on the main unit 2.

The main unit 2 includes a moving unit 9 and a posture controller 10 and is movable in a specified direction, e.g. a moving direction P by the moving unit 9.

The arm unit 3 includes a hand (gripping portion) 4, an arm 5 supporting this hand 4 at the leading end thereof, a joint unit 6 rotatably supporting the base end of the arm 5, an arm 7 rotatably supported by the joint unit 6 and a joint unit 8 rotatably supporting the base end of the arm 7.

The hand 4 has a function of gripping an object.

The joint unit 6 is disposed between the arms 5 and 7 and rotatably connects the arms 5, 7. Specifically, the joint unit 6 connects the arms 5, 7 such that the arms 5 and 7 are relatively rotatable in a rotating direction orthogonal to longitudinal directions of the arms 5, 7 and a rotating direction about longitudinal axes of the arms 5, 7.

The joint unit 8 is disposed between the main unit 2 and the arm 7 and rotatably connects the main unit 2 and the arm 7. Specifically, the joint unit 8 supports the arm 7 relative to the main unit 2 such that the arm 7 is rotatable in a rotating direction orthogonal to the longitudinal direction of the arm 7 and a rotating direction about the longitudinal axis of the arm 7.

The manipulator 1 of the first embodiment moves in a specified posture in the moving direction P, whereby a colliding force with an obstacle can be reduced even if the manipulator collides with the obstacle 11 without being able to avoid a collision with the obstacle 11 while moving in the moving direction P.

Specifically, as an essential portion II of FIG. 1 is enlargedly shown in FIG. 2, the posture controller 10 inclines the arm unit 3 (arms 5 and 7) in an oblique backward direction with respect to the moving direction P, for example, when the main unit 2 is moved. In other words, the posture controller 10 inclines the arm unit 3 with respect to the moving direction P such that a normal direction H to a front surface 12 (surface facing forward in the moving direction P of the arm 5 out of side surfaces of the arms 5, 7) is at a specified angle θp.

Next, a relationship of a colliding force given to the obstacle 11 by the arm unit 3 at the time of a collision and the posture of the arm unit 3 is described with reference to FIGS. 3A and 3B. Although the arms 5, 7 are respectively inclined backward with respect to the moving direction P, only the arm 5 is described below.

Figure 3A:
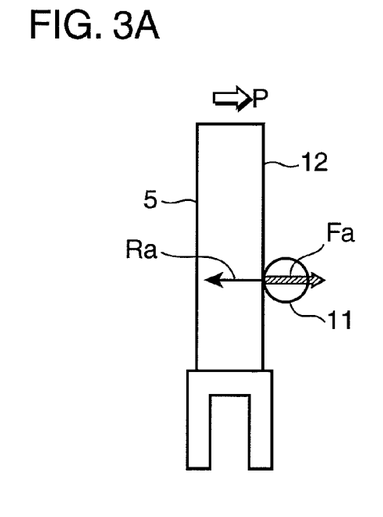

A case is described where the arm unit 3 is moved in the moving direction P in such a posture that the moving direction P and the normal direction H to the front surface 12 of the arm 5 are parallel (such a posture that the front surface 12 is orthogonal to the moving direction P) and collides head-on with the obstacle 11 as shown in FIG. 3A. In this case, a colliding force Fa is exerted to the obstacle 11 and a force having the same magnitude as the colliding force Fa and acting in an opposite direction, i.e. a reaction force Ra acts on the arm 5.

Figure 3B:
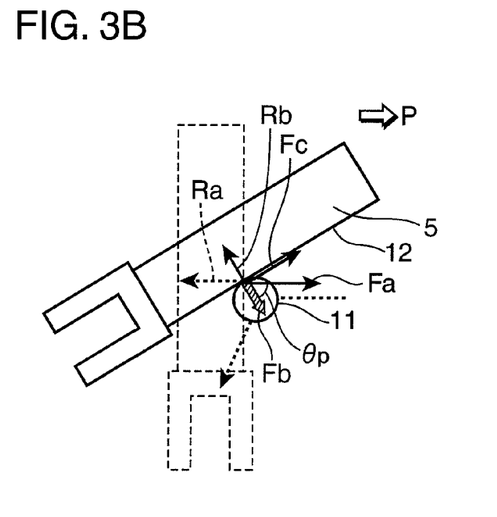

In this embodiment, by inclining the arm 5 in the oblique backward direction with respect to the moving direction P as shown in FIG. 3B, force can be more distributed as compared with the colliding force Fa in the case of a head-on collision (see FIG. 3A). Thus, the colliding force the obstacle 11 receives from the arm unit 3 is reduced to a colliding force Fb smaller than the colliding force Fa.

In other words, if the arm 5 is inclined obliquely backward with respect to the moving direction P as shown in FIG. 3B, the colliding force Fa in the event of a head-on collision shown in FIG. 3A is distributed into the colliding force Fb and a colliding force Fc. Thus, the colliding force received by the obstacle 11 from the arm unit 3 is reduced to the colliding force Fb which is a component of force of the colliding force Fa. Here, Fb=Fa cos (θp). The arm 5 receives a reaction force Rb acting in a direction opposite to the colliding force Fb. In other words, if cos (θp)<1, the colliding force Fb when the arm 5 is inclined as shown in FIG. 3B is smaller than the colliding force Fa when the arm 5 collides head-on in the posture of FIG. 3A (Fb<Fa).

In a conventional posture control device (not shown), if the arm 5 collides with the obstacle 11 despite an attempt to avoid the collision with the obstacle 11, there is a likelihood that the arm 5 in the posture shown in FIG. 3A collides head-on with the obstacle 11. In the case of a head-on collision, the colliding force is Fa.

In contrast, the manipulator 1 (see FIG. 1) according to the embodiment of the present invention moves the arms 5, 7 inclining obliquely backward with respect to the moving direction P while avoiding the collision of the arms 5, 7 with the obstacle 11. Thus, even if the collision with the obstacle 11 cannot be avoided, the colliding force Fa can be distributed.

In other words, the manipulator 1 can reduce the colliding force Fa to the colliding force Fb even if the arms 5, 7 collide with the obstacle 11 without being able to avoid it. Thus, damage of the obstacle 11 and that of the manipulator 1 can be reduced.

Although the arm 5 is inclined obliquely backward with respect to the moving direction P in the above description, the colliding force with the obstacle 11 can also be reduced to Fb similar to the above even if the arm 5 is inclined obliquely forward. However, in the case of inclining the arm 5 obliquely backward, the obstacle 11 having collided with the arm 5 receives an external force in a direction separating from the manipulator 1. Thus, a possibility that this obstacle 11 collides with the manipulator 1 again thereafter can be reduced. In this respect, it is more advantageous to incline the arm 5 obliquely backward than to incline the arm 5 obliquely forward.

Figure 4:
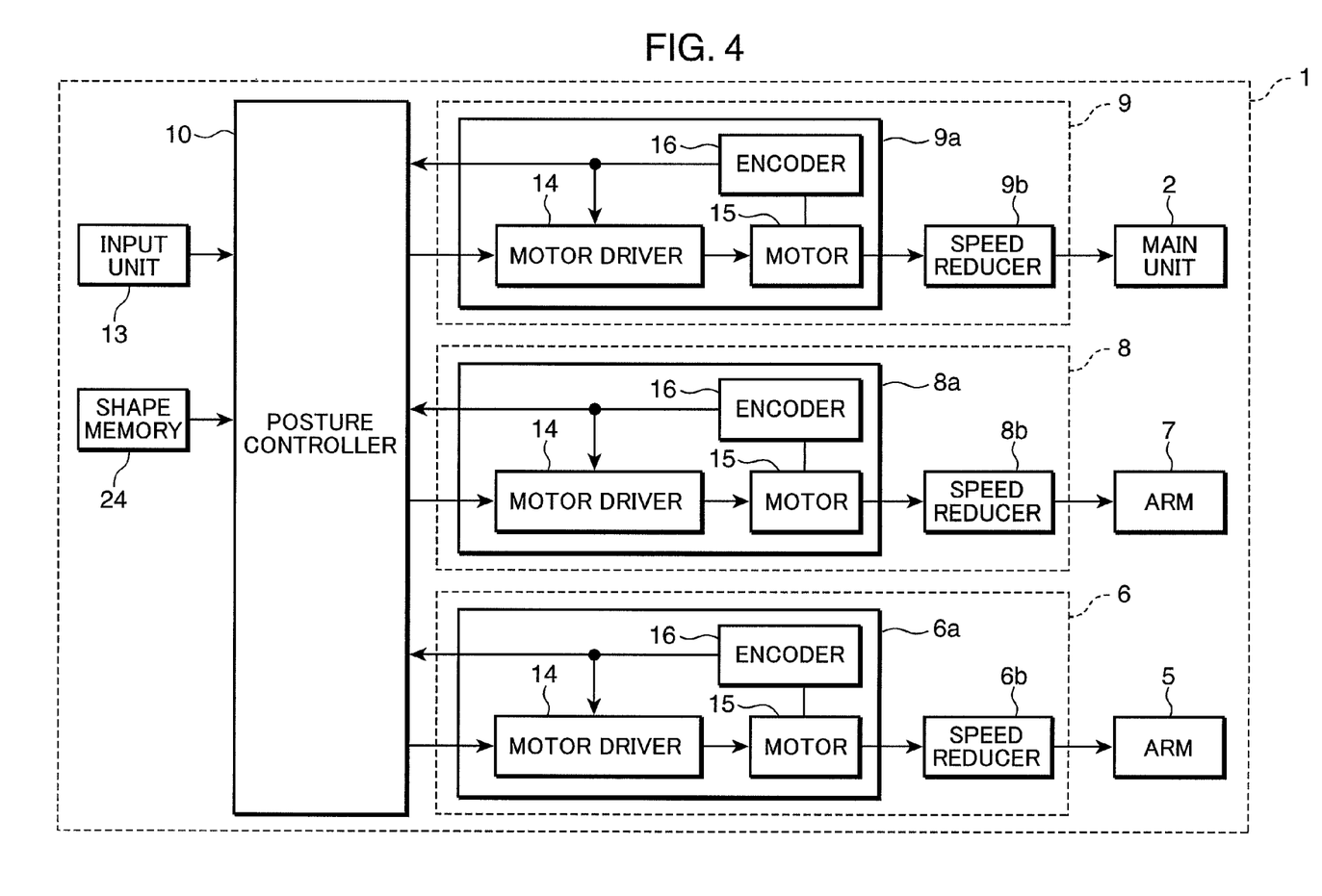
FIG. 4 is a block diagram showing the construction of the manipulator 1 according to the first embodiment of the invention.

Next, the construction of the manipulator 1 is described with reference to FIG. 4. FIG. 4 is a block diagram showing the construction of the manipulator 1 according to the embodiment of the present invention.

The joint unit 6 includes an actuator 6a as a joint driver and a speed reducer 6b coupled to the actuator 6a. Similarly, the joint unit 8 includes an actuator 8a and a speed reducer 8b coupled to the actuator 8a.

The actuator 6a rotates the arm 5 via the speed reducer 6b. Similarly, the actuator 8a rotates the arm 7 via the speed reducer 8b.

The speed reducers 6b, 8b decelerate the rotation of motors to be described later using known gears and increase drive torques. The speed reducers 6b, 8b also function as power transmission mechanisms for transmitting driving forces of the actuators 6a, 8a to the arms 5, 7. For example, planetary gear reducers, spur gear reducers and belt reduction mechanisms or the like can be used as the speed reducers 6b, 8b.

The moving unit 9 includes an actuator 9a as a movement driver and a speed reducer 9b coupled to the actuator 9a.

The actuator 9a rotates wheels of the main unit 2 via the speed reducer 9b. Thus, the main unit 2 can be moved by an instruction from the posture controller 10.

Each of the actuators 6a, 8a and 9a includes a drive motor 15, a motor driver 14 for driving the motor 15 and an encoder (posture detector) 16.

The motor driver 14 includes a drive circuit, which is, for example, an H-bridge drive circuit and supplies power to the motor 15 by this drive circuit to rotate the motor in forward and reverse directions.

The encoder 16 is coupled to a shaft (not shown) of the motor 15 and detects rotation information of the motor 15. An optical encoder including a code plate and a photosensor, a magnetic encoder including a Hall element, a magnetic resistance element and an NS bipolar magnetized rotating magnet or the like can be used as the encoder 16.

An input unit 13 includes various input devices for inputting an operation instruction such as a target position to the posture controller 10. For example, a key input device, a joystick, a touch panel and the like can be used as input devices. The input unit 13 may be accommodated in the main unit 2 or may be a separate unit to the main unit 2. Further, in the case of constructing the manipulator 1 as another unit capable of autonomic movements, the input unit 13 may input an operation instruction from an external superior control device (not shown).

The posture controller 10 includes a central processing unit (CPU) for performing various functions based on programs, a read-only memory (ROM) storing various programs, a rewritable random access memory (RAM) for temporarily saving data, and an input/output device for inputting and outputting data to or from the outside.

The posture controller 10 drives the actuators 6a, 8a and 9a to control movements and the posture of the arm unit 3 by performing various programs based on an operation instruction, e.g. a target position obtained from the input unit 13. The posture controller 10 can detect the postures of the arms 5, 7 based on the rotation information of the motors 15 obtained from the encoders 16.

Figure 5:
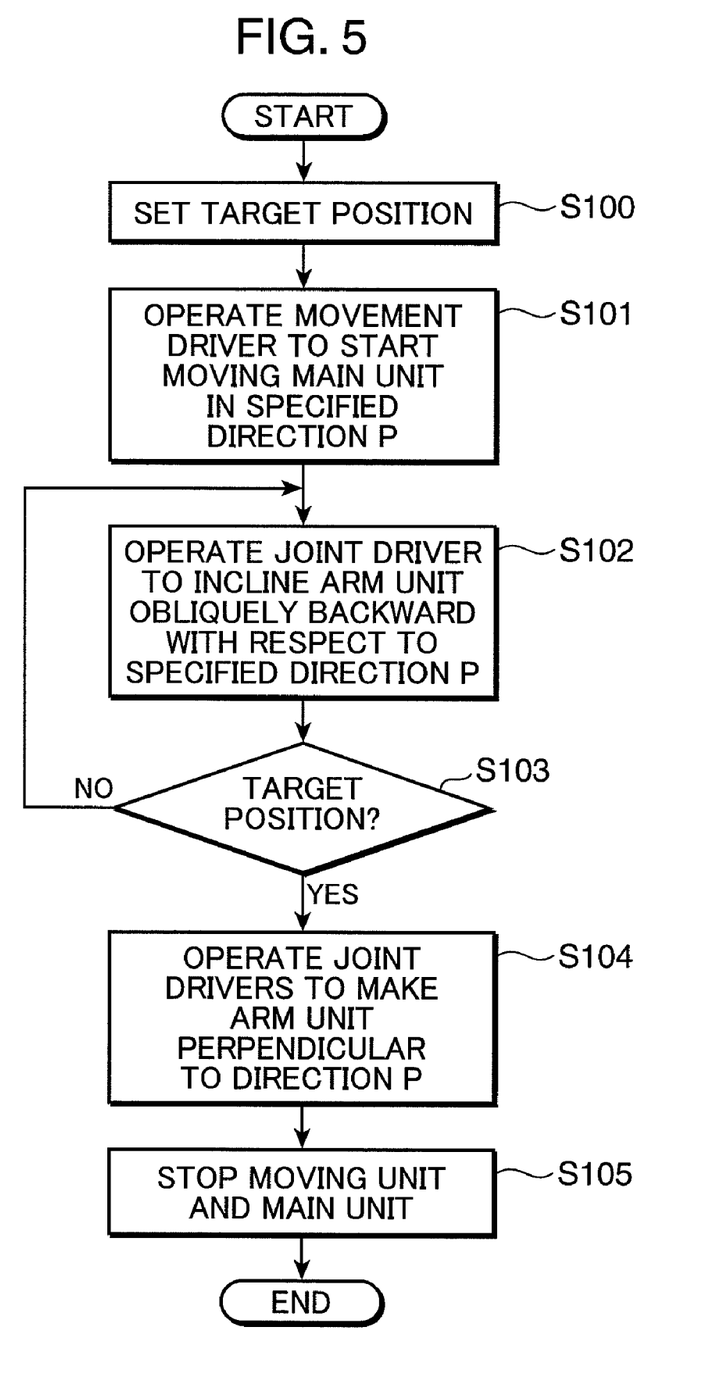
FIG. 5 is a flow chart showing a process performed by the manipulator 1 shown in FIG. 1.

Next, the operation of the manipulator 1 is described with reference to FIGS. 5 to 7. FIG. 5 is a flow chart showing a process performed by the manipulator 1 shown in FIG. 1, FIG. 6 is a diagram showing a change of an arm posture at the start of a movement of the manipulator 1 shown in FIG. 1, and FIG. 7 is a diagram showing a change of the arm posture upon stopping the manipulator 1 shown in FIG. 1.

As shown in FIG. 5, the manipulator 1 sets a target position in accordance with an operation instruction from the input unit 13 (Step S100). The manipulator 1 moves the main unit 2 using the moving unit 9, thereby starting a movement in the specified moving direction P toward the target position (Step S101).

Subsequently, the manipulator 1 inclines the arms 5, 7 obliquely backward with respect to the moving direction P by rotating the joint unit 8 with the arm unit 3 so stretched that the arms 5 and 7 are in alignment (Step S102).

Figure 6:
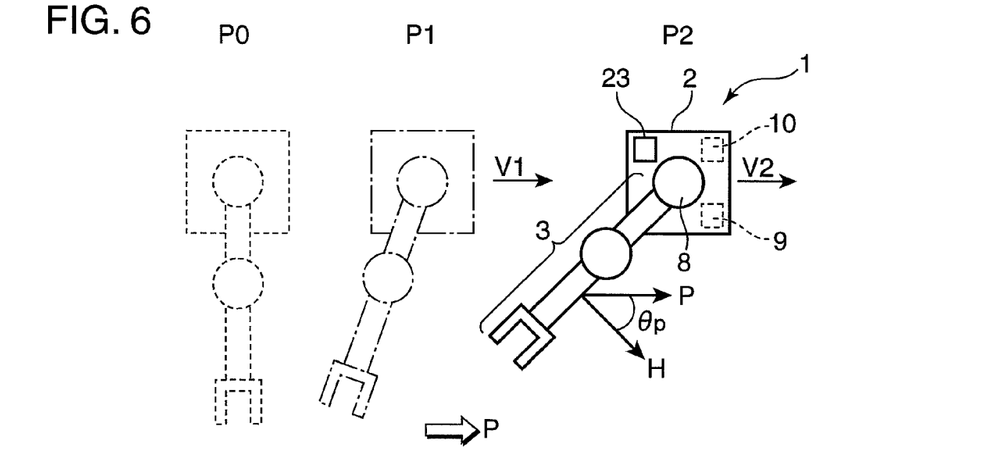
FIG. 6 is a diagram showing a change of an arm posture at the start of a movement of the manipulator 1 shown in FIG. 1.
Figure 7:
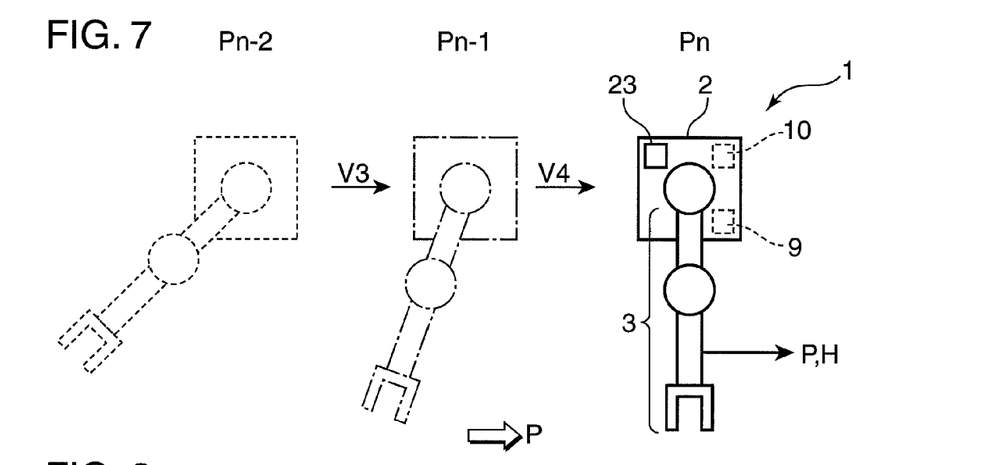
FIG. 7 is a diagram showing a change of the arm posture upon stopping the manipulator 1 shown in FIG. 1.

In Step S102, the posture controller 10 successively changes the posture of the arm unit 3 with respect to the moving direction P in accordance with a moving velocity, for example, as shown in FIG. 6. In other words, the posture controller 10 moves the main unit 2 in the order of position P0 (stop position), position P1 (position where the moving velocity is V1) and position P2 (position where the moving velocity is V2) using the moving unit 9. At this time, the arms 5, 7 are inclined obliquely backward by rotating the joint unit 8 such that the angle of inclination θp of the arms 5, 7 with respect to the moving direction P is successively increased to a specified angle as the moving velocity increases. Here, it is assumed that V2>V1.

Although the control executed with the arm unit 3 stretched out such that the arms 5, 7 are in alignment is described above, it is also possible to individually control angles of rotation of the arms 5, 7 such that the front surfaces 12 of the arms 5, 7 are inclined with respect to the moving direction P. This similarly holds in the case where the arm unit 3 includes three or more arms.

Subsequently, the manipulator 1 judges whether or not a position reached by the movement is the target position (Step S103). If the reached position is not the target position, Step S102 is performed to maintain the inclination of the arms 5, 7.

On the other hand, upon judging that the reached position is the target position, the manipulator 1 rotates the joint unit 8 to set the arms 5, 7 in a stop posture (Step S104).

In Step S104, the posture controller 10 successively changes the posture of the arm unit 3 with respect to the moving direction P in accordance with the moving velocity as shown in FIG. 7. In other words, the posture controller 10 moves the main unit 2 in the order of position Pn-2 (position where the moving velocity is V3), position Pn-1 (position where the moving velocity is V4) and position Pn (stop position) using the moving unit 9. At this time, the joint unit 8 is rotated such that the angle of inclination θp of the arms 5, 7 with respect to the moving direction P is successively decreased as the moving velocity decreases. The posture controller 10 controls the posture of the arm unit 3 such that the angle θp to the moving direction P is, for example, 0 when the moving unit 9 is stopped. Here, it is assumed that V3>V4. The arm unit 3 may be stopped by controlling the angle θp to take an arbitrary posture.

Subsequently, the posture controller 10 stops the moving unit 9 at the target position (Step S105). In this way, the main unit 2 of the manipulator 1 stops.

As described above, the manipulator 1 of this embodiment inclines the arm unit 3 obliquely backward with respect to the moving direction P upon moving the main unit 2. In this way, a colliding force given to the obstacle 11 is distributed, for example, if the arm unit 3 collides with the obstacle 11 without being able to avoid a collision with the obstacle 11. Thus, the colliding force between the arm 5 or 7 and the obstacle 11 can be reduced to the smaller colliding force Fb (Fb<Fa) than the colliding force Fa (see FIG. 3A) given to the obstacle 11 when the arm 5 or 7 collides head-on. Therefore, it is possible to suppress damage on the obstacle 11 and also damage on the manipulator 1.

Figure 8:
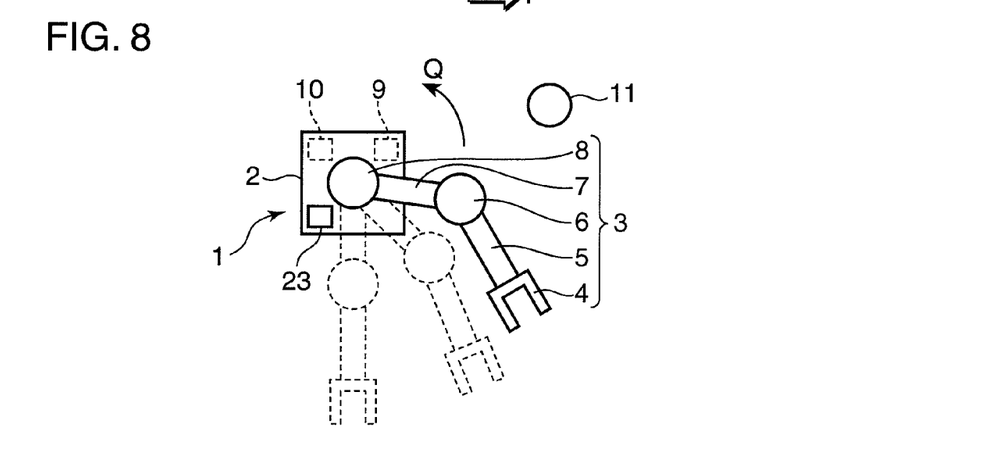
FIG. 8 is a top view showing a rotational movement of an arm unit of the manipulator 1 according to the first embodiment of the invention.

Even in the case of rotating the arm unit 3 in a stationary state of the main unit 2, a colliding force at the time of a collision with the obstacle 11 can be suppressed. This case is described with reference to FIG. 8. FIG. 8 is a top view showing a rotational movement of the arm unit 3 of the manipulator 1 according to the embodiment of the present invention.

As shown in FIG. 8, the manipulator 1 rotates the joint unit 8 to rotate the arm unit 3 in a specified rotating direction Q. The manipulator 1 rotates the joint unit 8 up to a specified angle with respect to this specified rotating direction Q and inclines the leading end (e.g. the arm 5 and the hand 4) of the arm unit 3, which is located more toward the leading end than the arm 7 to be rotated, obliquely backward. An angle (angle of inclination) between the arms 5 and 7 is adjusted by rotating the joint unit 6.

Even in such a case, the leading end of the arm unit 3 in a posture inclined with respect to the obstacle 11 collides with the obstacle 11 if it cannot avoid a collision with the obstacle 11. Thus, a colliding force given to the obstacle 11 from the arm unit 3 can be distributed.

Figure 9:
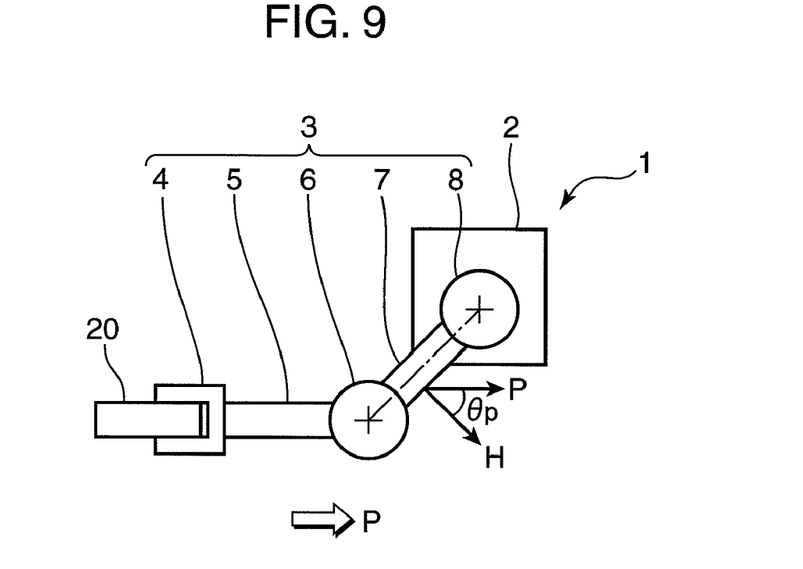
FIG. 9 is a top view showing the arm posture during a movement of the manipulator 1.

A case is thought where the hand 4 grips an object 20 during a movement of the main unit 2 as shown in a top view of FIG. 9. In this case, the posture of the arm unit 3 can be changed such that the entire arm unit 3 except the hand 4 moves in the moving direction P before the object 20 gripped by the hand 4. In this way, the object 20 gripped by the hand 4 can be protected from an external environment by the arms 5, 7 and the joint units 6, 8.

Figure 10:
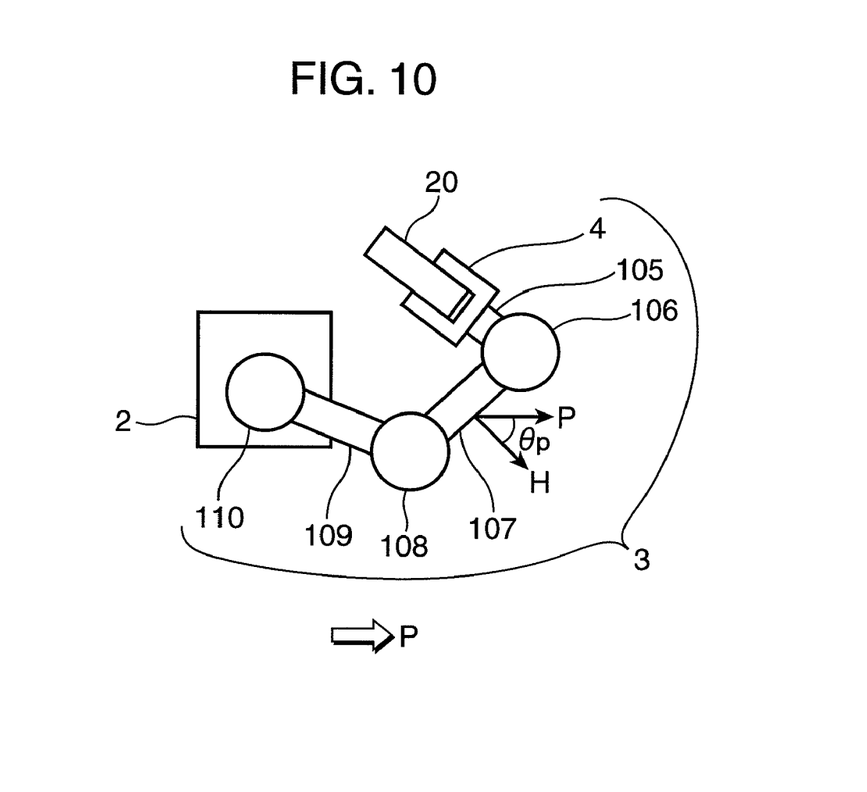
FIG. 10 is a top view showing the posture of another arm unit during a movement of the manipulator 1.

If the arm unit 3 includes three joint units 106, 108 and 110, three arms 105, 107 and 109 and the hand 4 as shown in a top view of FIG. 10, the posture of the arm unit 3 can also be changed such that the object 20 gripped by the hand 4 is located behind the most forward part (joint unit 106 in this example) of the arm unit 3 in the moving direction P.

Figure 11:
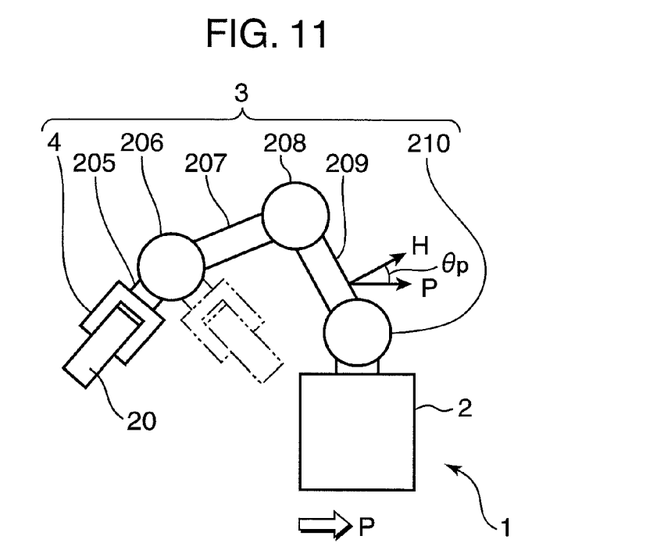
FIG. 11 is a side view showing the posture of still another arm unit during a movement of the manipulator 1, FIG. 12 are diagrams showing changes of the posture of the other arm unit upon stopping the manipulator 1, FIG. 13 are sections of the arm along XIII-XIII of FIG. 2.

If the arm unit 3 includes three joint units 206, 208 and 210, three arms 205, 207 and 209 and the hand 4 as shown in a top view of FIG. 11, the posture of the arm unit 3 may be changed such that the object 20 gripped by the hand 4 of the arm unit 3 is located behind the most forward part (main unit 2 in this example) of the arm unit 3 in the moving direction P and surrounded by the three arms 205, 207 and 209 (posture shown by broken line in FIG. 11).

Figure 12A:
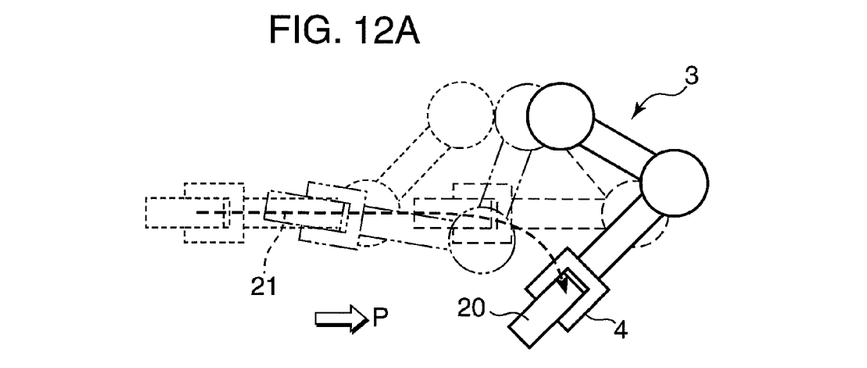

Further, as shown in FIG. 12A, the posture of the arm unit 3 may be successively changed such that the hand 4 moves along a movement path 21 set beforehand with respect to the moving direction P upon stopping the manipulator 1. The movement path 21 is the one set, attaching importance to the movement of the arm unit 3 before the object 20 by inclining the arms 5, 7 with respect to the moving direction P. Accordingly, the posture of the arm unit 3 can be controlled with priority given to the protection of the object 20 by moving the object 20 along the movement path 21. By such a posture control, it is possible to protect the object 20 by the main unit 2 and reduce the colliding force with the obstacle 11.

Figure 12B:
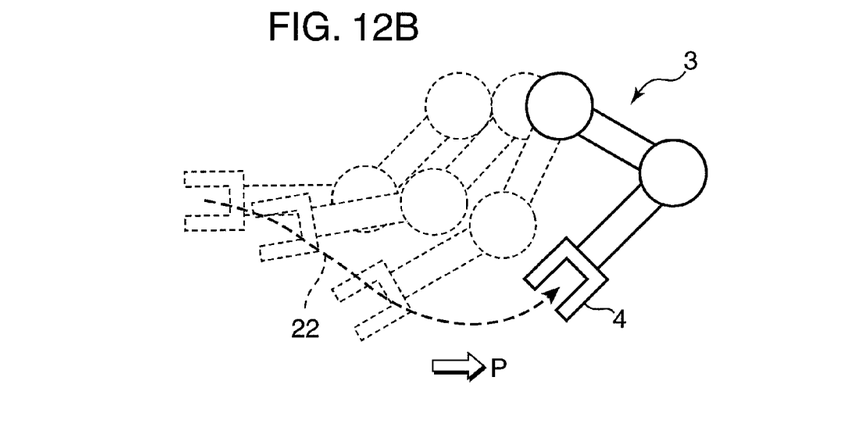

On the other hand, as shown in FIG. 12B, the posture of the arm unit 3 may be successively changed such that the hand 4 moves along a movement path 22 in order to prioritize a reduction of the colliding force. The movement path 22 is the one set, prioritizing the inclination of the arms 5, 7 with respect to the moving direction P over the movement of the arm unit 3 before the object 20. Accordingly, the posture control prioritizing the reduction of the colliding force can be executed by moving the object 20 along the movement path 22.

Next, a construction for suppressing a colliding force given to the obstacle upon the collision of a flat portion 17 when the side surface of the arm 5 has the flat portion 17 is described mainly with reference to FIGS. 1 and 13. FIG. 13 are sections of the arm 5 along XIII-XIII of FIG. 2.

As shown in FIG. 13, the manipulator 1 is oriented such that the flat portion 17 is located at the front side in the moving direction P. Further, the posture of the arm unit 3 is changed such that a normal direction H to the flat portion 17 is at a specified angle to the moving direction P in accordance with the velocity of the main unit 2 of the manipulator 1 and the velocity of the obstacle 11.

As a relative velocity V (Va, Vb, Vc) of the arm 5 and the obstacle 11 increases, a colliding force given to the obstacle 11 by the arm 5 increases when the obstacle 11 and the arm 5 collide. Thus, the main unit 2 of the manipulator 1 includes an obstacle detector 23 (see FIG. 1) for detecting a relative velocity vector of the obstacle 11 and the arm 5 and increases an angle of inclination of the flat portion 17 of the arm 5 in accordance with the direction and magnitude of the relative velocity vector. Although the obstacle detector 23 is arranged in the main unit 2 in the manipulator 1 of this embodiment, it may be arranged in the arm unit 3 or arranged in a place (e.g. ceiling) other than the main unit 2 and the arm unit 3.

Figure 13A:
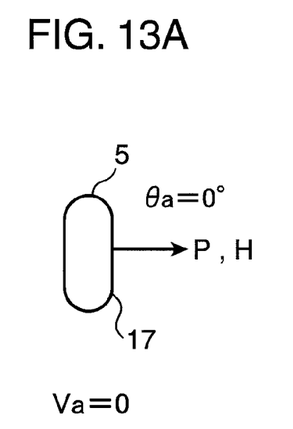
Figure 13B:
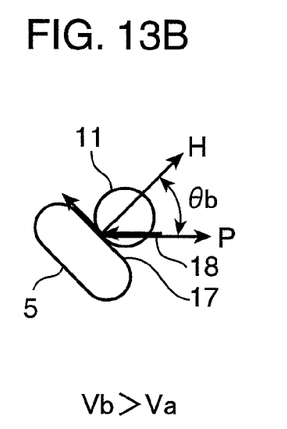
Figure 13C:
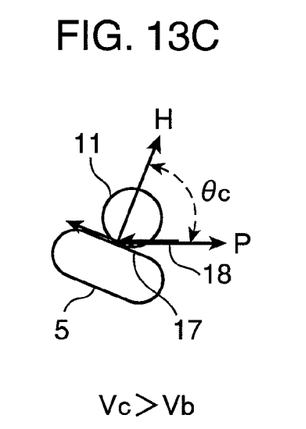

For example, it is assumed that an angle θa between the moving direction P and the normal direction H to the flat portion 17 is 0° when the relative velocity vector Va of the arm 5 relative to the obstacle 11 is 0 m/s as shown in FIG. 13A. Further, it is assumed that the angle between the moving direction P and the normal direction H to the flat portion 17 is θb (θb>θa) when the magnitude of the relative velocity vector of the arm 5 relative to the obstacle 11 is Vb (Vb>Va) as shown in FIG. 13B. Furthermore, it is assumed that the angle between the moving direction P and the normal direction H to the flat portion 17 is θc (θc>θb) when the magnitude of the relative velocity vector of the arm 5 relative to the obstacle 11 is Vc (Vc>Vb) as shown in FIG. 13C.

In this way, the inclination of the flat portion 17 of the arm 5 is increased as the magnitude of the relative velocity vector of the arm 5 relative to the obstacle 11 increases. As a result, it can be suppressed that the colliding force exerted to the arm 5 at the time of a collision increases as the magnitude of the relative velocity vector of the arm 5 and the obstacle 11 increases. If the arm 7 is also formed with a flat portion 17, the flat portion 17 can be inclined similarly for the arm 7 as the magnitude of a relative velocity vector increases.

The obstacle detector 23 detects movement information of the obstacle 11 including a distance and a direction, for example, from stereo-captured images obtained from two cameras. The arm unit 3 (arms 5, 7) shown in FIG. 1 may be inclined obliquely backward with respect to the direction of the relative velocity vector. The arm unit 3 is inclined such that the normal direction H to the front surface 12 is at the specified angle θp to the direction of the relative velocity vector. In this way, the arm unit 3 can react not only with respect to the moving direction P of the main unit 2, but also with respect to the moving direction of the obstacle 11, wherefore the inclination of the arm unit 3 can be adjusted with respect to the direction of the relative velocity vector. In this way, the colliding force received by the arm 5 can be more suppressed.

Figure 14:
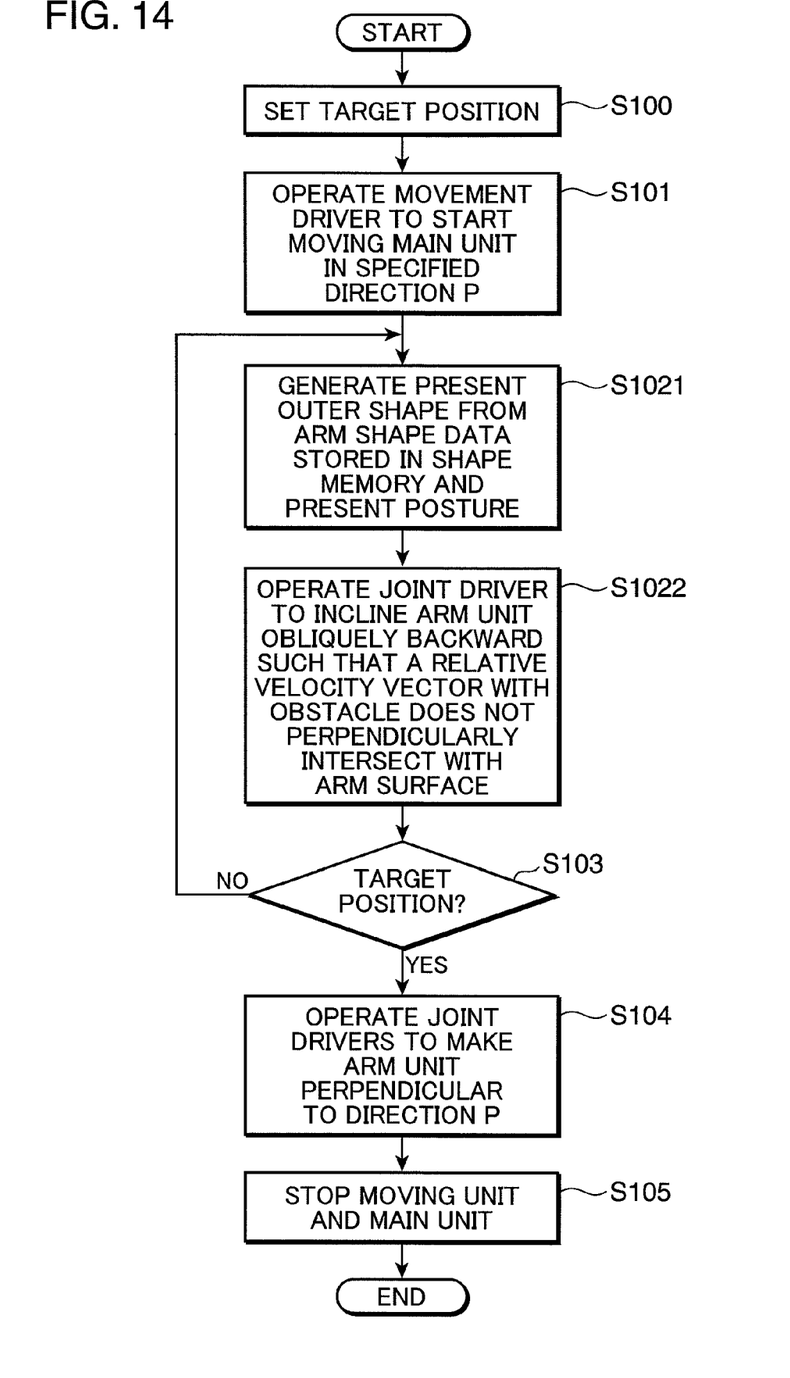
FIG. 14 is a flow chart showing a modification of the process performed by the manipulator 1, FIG. 15 are partial perspective views of an arm of the manipulator 1, and FIG. 16 are diagrams showing a re-collision avoiding operation of the arm unit of the manipulator 1.

Although the arms 5, 7 include the flat portions 17 in this embodiment, a colliding force upon a collision of the arms 5 and 7 with the obstacle 11 can be reduced by employing a construction described below even if the side surfaces of the arms 5, 7 has complicated shapes such as uneven shapes. This construction is described below with reference to FIGS. 4 and 14. FIG. 14 is a flow chart showing a modification of the process performed by the manipulator 1.

As shown in FIG. 4, the manipulator 1 includes a shape memory 24 for storing the shapes of the side surfaces of the arm unit 3. Information concerning the shapes of the side surfaces of the arms 5, 7, 105, 107, 109, 205, 207, 209 and the joint units 6, 8, 106, 108, 110, 206, 208 and 210 (hereinafter, called "arm shape data") is stored in this shape memory 24 according to needs.

The posture controller 10 specifies the shape of the front surface located at the front side in the moving direction (moving direction P, rotating direction Q) out of the side surfaces of the arms 5, 7, 105, 107, 109, 205, 207, 209 based on the posture of the arm unit 3 detected by the encoders 16 and the arm shape data stored in the shape memory 24. This is described below, taking the arm 5 as an example.

Here, the process performed by the posture controller 10 is described with reference to FIG. 14. Parts of the process similar to those described with reference to FIG. 5 are not described.

First of all, after performing Steps S100 and S101 described above, the outer shape of the arm unit 3 at the present time is specified based on the arm shape data from the shape memory 24 and the posture of the arm unit 3 detected by the encoders 16 (Step S1021). Specifically, in Step S1021, the orientations and shapes of the side surfaces of the arm 5 in the posture of the arm unit 3 at the present time are specified.

Subsequently, the relative velocity vector of the arm unit 3 relative to the obstacle 11 is detected by the obstacle detector 23, the front surface 12 located at the front side of the relative velocity vector out of the side surfaces of the arm 5 is specified, and the arm unit 3 is inclined obliquely backward such that this front surface 12 takes a posture other than the one orthogonal to the relative velocity vector (Step S1022).

By controlling the posture of the arm unit 3 such that the front surface 12 is not orthogonal to the relative velocity vector after specifying the shape of the front surface 12 of the arm 5 in this way, the front surface 12 of the arm 5 can be effectively inclined with respect to the relative velocity vector even if the side surfaces of the arm 5 have complicated shapes.

A method for inclining the front surface 12 of the arm 5 with respect to the relative velocity vector is not limited to the one for inclining the arm 5 in a direction orthogonal to the longitudinal direction of the arm 5 as shown in FIGS. 1 to 3 and 6 to 11. For example, the present invention also embraces the inclination of the front surface 12 by rotating the arm 5 about an axis along the longitudinal direction of the arm 5 as shown in FIGS. 13B and 13C. This point similarly holds for all the modes of the above embodiment.

An apparent movement relative to the obstacle 11 may be made by rotating the side surface of the arm 5 about the longitudinal direction of the arm 5. This operation is described with reference to FIG. 15. FIG. 15 are partial perspective view of the arm 5 of the manipulator 1 according to another modification of the embodiment of the present invention.

Figure 15A:
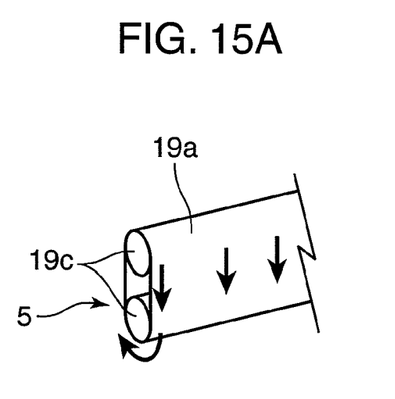

If the arm 5 includes a pair of rotary shafts 19c and an exterior portion 19a provided on the outer sides of the rotary shafts 19c as shown in FIG. 15A, the side surface of the arm 5 can be rotated by rotating the rotary shafts 19c inside the arm 5 to rotate the exterior portion 19a.

Here, which one of possible directions of rotating the side surface of the arm 5 is selected can be determined based on the relative velocity vector detected by the obstacle detector 23 and the side surface shapes of the arm unit 3 stored in the shape memory 24.

Specifically, the direction in which an angle of intersection of the side surface of the arm 5 and the relative velocity vector is wider is determined as the rotating direction of the arm 5 using a position of intersection of the side surface of the arm 5 and the relative velocity vector as a reference position. In this way, the side surface of the arm 5 can be rotated in such a direction as to more easily fend off the obstacle 11, i.e. in such a direction as to reduce a colliding force given to the obstacle 11 and the arm 5.

By doing so, even if the arm 5 collides with the obstacle 11 without being able to avoid it, a force acting in a direction to guide the obstacle to a lateral side of the arm 5 can be given to the obstacle 11 by rotating the exterior portion 19a. Thus, an apparent inclination can be formed between the arm 5 and the obstacle 11. Accordingly, a colliding force at the time of a collision of the arm 5 and the obstacle 11 can be distributed in a direction deviated from the moving direction P. By increasing the rotating velocity of the exterior portion 19a within a range below the relative velocity of the obstacle 11 and the arm 5, this apparent inclination can be increased.

Figure 15B:
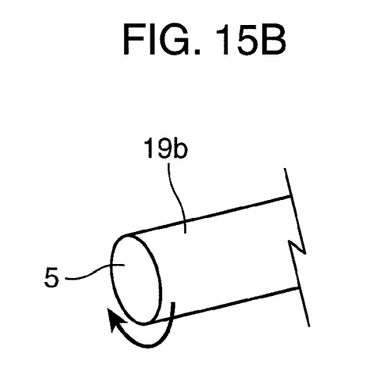

As shown in FIG. 15B, a side surface 19b of the arm 5 is rotated by rotating the arm 5 itself if there is no exterior portion. A colliding force at the time of a collision can also be mitigated by this. This similarly holds for the arms 7, 105, 107, 109, 205, 207 and 209.

Further, a kinetic momentum in a direction deviating the obstacle 11 from the movement path of the arm unit 3 may be actively given to the obstacle 11. This operation is described with reference to FIG. 16. FIG. 16 are diagrams showing a re-collision avoiding operation of the arm 5 of the manipulator 1 according to another modification of the embodiment of the present invention.

Figure 16A:
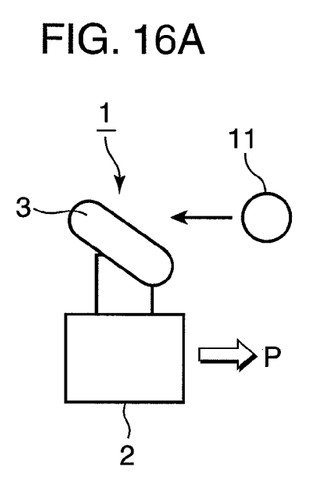
Figure 16B:
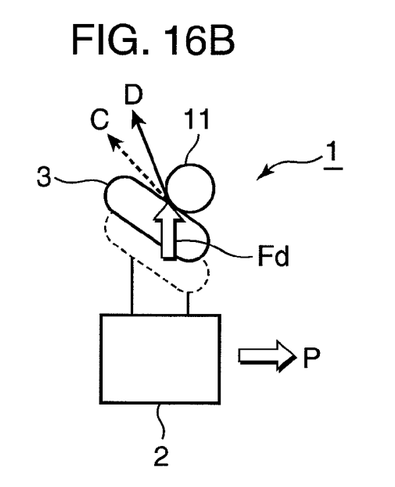

A case is described where the manipulator 1 is moving in the moving direction P and the obstacle 11 is moving in a direction opposite to the moving direction P as shown in FIG. 16A. By displacing the arm unit 3 when the obstacle 11 collides with the arm unit 3 as shown in FIG. 16B, a force Fd acts on the obstacle 11. In this way, the moving direction of the obstacle 11 is changed to a direction separating from the main unit 2, i.e. from a direction C to a direction D. By displacing the arm unit 3 and giving a kinetic momentum to the obstacle 11 in the direction deviating from the movement path of the arm unit 3 in this way, the re-collision of the obstacle 11 with the other part of the arm unit 3 can be suppressed.

The different modes of the above embodiment mainly embrace the inventions having the following constructions.

A manipulator according to the one aspect to the present invention comprises a main unit movable to a specified target position; an arm unit rotatably provided on the main unit; and a posture controller for controlling the posture of the arm unit so that a front surface of the arm unit facing forward in a moving direction of the arm unit is not orthogonal to the moving direction of the arm unit when the movement of the main unit or the rotation of the arm unit is performed.

According to the present invention, the arm unit can be moved in a posture controlled not to have a surface perpendicular to the moving direction of the arm unit. Thus, even if an obstacle and the arm unit collide, a colliding force can be reduced by being distributed as compared with the case where the arm unit and the obstacle collide in a direction in which the front surface of the arm unit and the moving direction are orthogonal. As a result, damage of the obstacle and that of the manipulator can be suppressed.

Thus, according to the present invention, a colliding force exerted to the obstacle can be reduced even in the case of a collision with the obstacle.

In the above manipulator, the posture controller preferably inclines the arm unit obliquely backward with respect to a moving direction of the main unit when the main unit is moved to the specified target position.

According to such a construction, since the arm unit is inclined obliquely backward with respect to the moving direction when the main unit is moved, the arm unit can collide with the obstacle while being inclined even if the arm unit and the obstacle collide. Thus, a colliding force exerted from the arm unit to the obstacle can be distributed, whereby the colliding force given to the obstacle by the arm unit can be reduced as compared with a head-on collision.

In the above manipulator, it is preferable that the arm unit includes a plurality of arms and a joint unit rotatably connecting the plurality of arms; and that the posture controller controls angles of rotation of the arms such that front surfaces of the arms facing forward in the moving direction of the arm unit are not orthogonal to the moving directions of the arms.

According to such a construction, a control can be so executed that the front surfaces of the respective arms are not perpendicular to the moving directions of the respective arms for the plurality of arms rotatably connected to each other by the joint unit.

In the above manipulator, an obstacle detector for detecting a relative velocity vector of the main unit and an obstacle may be further provided; and the posture controller may control the posture of the arm unit based on a detection result by the obstacle detector.

According to such a construction, a force produced when the arm unit and the obstacle collide can be distributed in a direction of the relative velocity vector. Thus, the inclination of the arm unit can be adjusted in accordance with a moving direction of the obstacle in addition to the moving direction of the main unit, whereby a colliding force given to the obstacle by the arm unit can be alleviated.

In the above manipulator, a side surface of the arm unit may include a flat portion; and the posture controller may control the posture of the arm unit such that the flat portion faces forward in the moving direction and the inclination thereof with respect to the direction of the relative velocity vector increases as the magnitude of the relative velocity vector increases.

According to such a construction, the inclination of the flat portion with respect to the direction of the relative velocity vector can be increased in accordance with the magnitude of the relative velocity vector. In this way, a colliding force given to the obstacle by the flat portion can be effectively alleviated in accordance with the magnitude of the relative velocity vector.

In the above manipulator, the arm unit may be formed such that at least a side surface of the arm unit is rotatable about an axis along a longitudinal direction of the arm unit; and the posture controller may rotate the side surface of the arm unit in such a direction as to reduce a colliding force received from the obstacle based on a detection result by the obstacle detector.

According to such a construction, the arm unit can have an apparent inclination with respect to the obstacle in addition to an inclination with respect to the relative velocity vector, the colliding force exerted to the obstacle can be more effectively distributed and the colliding force given to the obstacle by the arm unit can be alleviated.

In the above manipulator, the posture controller may displace the arm unit in such a manner as to give a kinetic momentum in a direction deviating from a movement path of the arm unit to the obstacle based on a detection result by the obstacle detector.

According to such a construction, a possibility of a re-collision of the other part of the manipulator and the obstacle can be reduced since the kinetic momentum can be given to the obstacle in the direction separating from the main unit.

In the above manipulator, the arm unit may include a gripping portion capable of gripping an object at the leading end of the arm unit; and the posture controller may control the posture of the arm unit such that a part of the arm unit other than the gripping portion moves before the gripping portion in the moving direction.

According to such a construction, a possibility of a collision of the object gripped by the gripping portion and the obstacle can be reduced by causing the part of the arm unit other than the gripping portion to move before the gripping portion Thus, when the arm unit moves in the specified moving direction, the object can be protected.

In the above manipulator, the arm unit may include a first arm and a second arm rotatably supported on the leading end of the first arm; and the posture controller may incline the second arm obliquely backward with respect to a rotating direction of the first arm when the first arm is rotated relative to the main unit.

According to such a construction, if the second arm located more toward the leading end of the arm unit than the first arm to be rotated collides with the obstacle without being able to avoid a collision with the obstacle, it collides with the obstacle in an inclined posture, wherefore a colliding force exerted to the obstacle can be distributed. Thus, it is possible to suppress damage of the obstacle and that of the manipulator.

In the above manipulator, a shape memory for storing the shapes of the side surface of the arm unit and a posture detector capable of detecting the posture of the arm unit may be further provided; and the posture controller may specify the shape of the front surface of the arm unit based on the posture of the arm unit detected by the posture detector and the shapes of the side surfaces of the arm unit stored in the shape memory.

According to such a construction, since the shape of the front surface facing forward can be specified out of the side surfaces of the arm unit, this front surface can be effectively inclined with respect to the moving direction even if the side surfaces of the arm unit have complicated shapes such as uneven shapes.

A manipulator posture control method according to another aspect of the present invention is characterized by controlling a posture of an arm unit such that a front surface of the arm unit facing forward in a moving direction is not orthogonal to a moving direction of the arm unit when at least one of the movement of a main unit movable to a specified target position and the rotation of the arm unit rotatably provided on the main unit is performed.

According to the present invention, since the arm unit can be so controlled as not to have a surface perpendicular to the moving direction of the arm unit, even if an obstacle and the arm unit collide, a colliding force can be distributed as compared with the case where the arm unit and the obstacle collide in a direction in which a side surface of the arm unit and the moving direction are orthogonal. As a result, damage of the obstacle and that of the manipulator can be suppressed.

In the above manipulator posture control method, the arm unit may be inclined obliquely backward with respect to a moving direction of the main unit when the main unit is moved.

According to such a method, since the arm unit is inclined obliquely backward with respect to the moving direction when the main unit is moved, even if an obstacle and the arm unit collide, the arm unit can collide with an obstacle while being inclined. Thus, a colliding force of the arm unit with the obstacle can be distributed and a colliding force given to the obstacle by the arm unit can be reduced as compared with the case where the arm unit and the obstacle collide in a state where the moving direction and a longitudinal direction of the arm unit are orthogonal. As a result, damage of the obstacle and that of the manipulator can be suppressed.

In the above manipulator posture control method, upon rotating a first arm of the arm unit including the first arm and a second arm rotatably supported on the leading end of the first arm, a control may be executed to incline the second arm obliquely backward with respect to a rotating direction of the first arm.

According to such a method, since the second arm collides with an obstacle in an inclined state when the second arm located more toward the leading end of the arm unit than the first arm to be rotated collides with the obstacle without being able to avoid a collision with the obstacle, it collides with the obstacle in an inclined posture, wherefore a colliding force exerted to the obstacle can be reduced by being distributed.

As described above, according to the present invention, a manipulator and a posture control method can be provided which can reduce a colliding force exerted to an obstacle even if an arm unit collides with the obstacle without being able to avoid a collision with the obstacle.

Therefore, the present invention is useful for manipulators, posture control methods and the like.

A manipulator according to one aspect of the present invention comprises a main unit movable to a specified target position; an arm unit rotatably provided on the main unit; and a posture controller for controlling the posture of the arm unit so that a front surface of the arm unit facing forward in a moving direction is facing in a direction other than the one orthogonal to a moving direction of the arm unit when at least one of the movement of the main unit and the rotation of the arm unit is performed.

According to the present invention, the arm unit can be moved in a posture controlled not to have a surface perpendicular to the moving direction of the arm unit. Thus, even if an obstacle and the arm unit collide, a colliding force can be reduced by being distributed as compared with the case where the arm unit and the obstacle collide in a direction in which the front surface of the arm unit and the moving direction are orthogonal. As a result, damage of the obstacle and that of the manipulator can be suppressed.

Thus, according to the present invention, a colliding force exerted to the obstacle can be reduced even in the case of a collision with the obstacle.

In the above manipulator, it is preferable that the arm unit includes a plurality of arms and a joint unit rotatably connecting the plurality of arms; and that the posture controller controls angles of rotation of the arms such that front surfaces of the arms facing forward in the moving direction are facing in directions other than those orthogonal to the moving directions of the arms.

According to such a construction, a control can be so executed that the front surfaces of the respective arms are not perpendicular to the moving directions of the respective arms for the plurality of arms rotatably connected to each other by the joint unit.

A manipulator posture control method according to another aspect of the present invention is characterized by controlling a posture of an arm unit such that a front surface of the arm unit facing forward in a moving direction is facing in a direction other than the one orthogonal to the moving direction of the arm unit when at least one of the movement of a main unit movable to a specified target position and the rotation of the arm unit rotatably provided on the main unit is performed.

According to the present invention, since the arm unit can be so controlled as not to have a surface perpendicular to the moving direction of the arm unit, even if an obstacle and the arm unit collide, a colliding force can be distributed as compared with the case where the arm unit and the obstacle collide in a direction in which a side surface of the arm unit and the moving direction are orthogonal. As a result, damage of the obstacle and that of the manipulator can be suppressed.

This application is based on Japanese Patent Application No. 2008-152593 filed on Jun. 11, 2008 in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A manipulator, comprising:
a main unit movable to a specified target position;
an arm unit rotatably provided on the main unit; and
a posture controller for controlling the posture of the arm unit so that a front surface of the arm unit facing forward in a moving direction of the main unit is not orthogonal to the moving direction of the main unit when the movement of the main unit is performed; and
an obstacle detector for detecting a relative velocity vector of the main unit and an obstacle,
wherein the posture controller controls the posture of the arm unit based on a detection result of the obstacle detector;
wherein a side surface of the arm unit includes a flat portion; and
wherein the posture controller controls the posture of the arm unit such that the flat portion faces forward in the moving direction and the inclination thereof with respect to the direction of the relative velocity vector increases as the magnitude of the relative velocity vector increases.

2. The manipulator of claim 1, wherein the posture controller inclines the arm unit obliquely backward with respect to a moving direction of the main unit when the main unit is moved to the specified target position.

3. The manipulator of claim 1, wherein:
the arm unit includes a plurality of arms and a joint unit rotatably connecting the plurality of arms; and
the posture controller controls angles of rotation of the arms such that front surfaces of the arms facing forward in the moving direction of the arm unit are not orthogonal to the moving directions of the arms.

4. The manipulator of claim 1, wherein:
the arm unit is formed such that at least a side surface of the arm unit is rotatable about an axis along a longitudinal direction of the arm unit; and
the posture controller rotates the side surface of the arm unit in such a direction as to reduce a colliding force received from the obstacle based on the detection result by the obstacle detector.

5. The manipulator of claim 1, wherein the posture controller displaces the arm unit in such a manner as to give a kinetic momentum in a direction deviating from a movement path of the arm unit to the obstacle based on the detection result by the obstacle detector.

6. The manipulator of claim 1, wherein:
the arm unit includes a gripping portion capable of gripping an object at the leading end of the arm unit; and
the posture controller controls the posture of the arm unit such that a part of the arm unit other than the gripping portion moves before the gripping portion in the moving direction.

7. The manipulator of claim 1, wherein:
the arm unit includes a first arm and a second arm rotatably supported on the leading end of the first arm; and
the posture controller inclines the second arm obliquely backward with respect to a rotating direction of the first arm when the first arm is rotated relative to the main unit.

8. The manipulator of claim 1, wherein the main unit is linearly movable to the specified target position, and the arm unit is rotatable relative to the main unit during linear movement of the main unit.

9. A manipulator, comprising:
a main unit movable to a specified target position;
an arm unit rotatably provided on the main unit;
a posture controller for controlling the posture of the arm unit so that a front surface of the arm unit facing forward in a moving direction of the main unit is not orthogonal to the moving direction of the main unit when the movement of the main unit is performed;
a shape memory for storing the shapes of the side surface of the arm unit; and
a posture detector capable of detecting the posture of the arm unit,
wherein the posture controller specifies the shape of the front surface of the arm unit based on the posture of the arm unit detected by the posture detector and the shapes of the side surfaces of the arm unit stored in the shape memory.

10. A manipulator posture control method, comprising:
moving a main unit to a specified target position, an arm unit being rotatably provided on the main unit, and a side surface of the arm unit including a flat portion;
controlling a posture of the arm unit such that a front surface of the arm unit facing forward in a moving direction of the main unit is not orthogonal to a moving direction of the main unit when the movement of the main unit movable to the specified target position is performed; and
using an obstacle detector to detect a relative velocity vector of the main unit and an obstacle,
wherein said controlling the posture operation includes controlling the posture of the arm unit based on a detection result of the obstacle detector, and controlling the posture of the arm unit such that the flat portion faces forward in the moving direction and the inclination thereof with respect to the direction of the relative velocity vector increases as the magnitude of the relative velocity vector increases.

11. The method of claim 10, wherein a control is executed to incline the arm unit obliquely backward with respect to the moving direction of the main unit when the main unit is moved.

12. The method of claim 10, wherein the arm unit includes a first arm and a second arm rotatably supported on a leading end of the first arm, wherein the method further comprises:

rotating the first arm unit; and during said rotating the first arm unit, inclining the second arm obliquely backward with respect to a rotating direction of the first arm.

13. The method of claim 10, wherein at least a side surface of the arm unit is rotatable about an axis along a longitudinal direction of the arm unit; and wherein the method further comprises rotating the side surface of the arm unit in such a direction as to reduce a colliding force received from the obstacle based on the detection result by the obstacle detector.

14. The method of claim 10, wherein said controlling the posture operation includes displacing the arm unit in such a manner as to give a kinetic momentum in a direction deviating from a movement path of the arm unit to the obstacle based on the detection result by the obstacle detector.

15. The method of claim 10, wherein the arm unit includes a gripping portion capable of gripping an object at the leading end of the arm unit; and wherein said controlling the posture operation includes controlling the posture of the arm unit such that a part of the arm unit other than the gripping portion moves before the gripping portion in the moving direction.

16. The method of claim 10, wherein said moving operation includes linear movement of the main unit, and wherein the method further comprises rotating the arm unit relative to the main unit during the linear movement of the main unit.

* * * * *